(12) United States Patent
Earl

(10) Patent No.: US 12,000,291 B2
(45) Date of Patent: Jun. 4, 2024

(54) HYDROGEN COOLING TURBOEXPANDER

(71) Applicant: Sapphire Technologies, Inc., Cerritos, CA (US)

(72) Inventor: Jeffrey Earl, Hermosa Beach, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 66 days.

(21) Appl. No.: 17/935,740

(22) Filed: Sep. 27, 2022

(65) Prior Publication Data

US 2024/0102401 A1 Mar. 28, 2024

(51) Int. Cl.
*F01D 15/10* (2006.01)
*F01D 25/12* (2006.01)

(52) U.S. Cl.
CPC ............ *F01D 15/10* (2013.01); *F01D 25/12* (2013.01); *F05D 2220/7642* (2013.01); *F05D 2260/20* (2013.01); *F05D 2270/3011* (2013.01); *F05D 2270/3013* (2013.01); *F05D 2270/303* (2013.01)

(58) Field of Classification Search
CPC .. F01D 15/10; F01D 25/12; F05D 2220/7642; F05D 2260/20; F05D 2270/3011; F05D 2270/3013; F05D 2270/303
See application file for complete search history.

(56) References Cited

U.S. PATENT DOCUMENTS

| | | | |
|---|---|---|---|
| 7,638,892 B2 | 12/2009 | Myers | |
| 8,146,360 B2 | 4/2012 | Myers et al. | |
| 8,384,232 B2 | 2/2013 | Myers et al. | |
| 8,400,005 B2 | 3/2013 | Huber et al. | |
| 8,739,538 B2 | 6/2014 | Myers et al. | |
| 8,839,622 B2 | 9/2014 | Myers et al. | |
| 2004/0040304 A1 | 3/2004 | Wolff et al. | |
| 2005/0144979 A1 | 1/2005 | Zollinger et al. | |
| 2007/0000561 A1 | 1/2007 | Handa | |
| 2007/0068713 A1* | 3/2007 | Komura | B60K 6/24 429/425 |
| 2012/0013125 A1 | 1/2012 | Myers et al. | |
| 2013/0286591 A1 | 10/2013 | Myers et al. | |
| 2013/0319359 A1* | 12/2013 | Evans | B60L 1/003 60/327 |

(Continued)

FOREIGN PATENT DOCUMENTS

WO WO 2021/104912 6/2021

OTHER PUBLICATIONS

Elgowainy et al., "Techno-economic and thermodynamic analysis of pre-cooling systems at gaseous hydrogen refueling stations," Science Direct, Dec. 7, 2017, 24 pages.

(Continued)

*Primary Examiner* — Jesse S Bogue
(74) *Attorney, Agent, or Firm* — Fish & Richardson P.C.

(57) ABSTRACT

A hydrogen dispensing system includes a hydrogen storage tank for storing hydrogen gas, a turboexpander generator fluidly connected to the hydrogen storage tank, and a dispenser fluidly connected to the turboexpander generator. The turboexpander generator receives a flow of the hydrogen gas from the hydrogen storage tank at an inlet of the turboexpander generator, reduces a pressure and a temperature of the flow of hydrogen gas, and outputs the hydrogen gas to the dispenser.

19 Claims, 3 Drawing Sheets

(56) References Cited

U.S. PATENT DOCUMENTS

| | | | | |
|---|---|---|---|---|
| 2014/0250891 A1* | 9/2014 | Evans, Jr. | ............... | F02D 29/06 |
| | | | | 60/698 |
| 2014/0373531 A1* | 12/2014 | Wong | ................ | F02M 21/0239 |
| | | | | 60/605.1 |
| 2021/0036345 A1* | 2/2021 | Tsubouchi | ........ | H01M 8/04201 |
| 2022/0381160 A1* | 12/2022 | Miftakhov | ........ | H01M 8/04201 |
| 2023/0069975 A1* | 3/2023 | Quartarone | ............. | H01M 8/22 |

OTHER PUBLICATIONS

Fuel Cell Standards Committee, "Fueling Protocols for Light Duty Gaseous Hydrogen Surface Vehicles J2601 (WIP)," Society of Automotive Engineers International, Sep. 24, 2021, 2 pages.

International Search Report and Written Opinion in International Appln. No. PCT/US2023/033616, dated Jan. 3, 2024, 13 pages.

* cited by examiner

HYDROGEN COOLING TURBOEXPANDER

TECHNICAL FIELD

This disclosure relates to electrical power generation systems.

BACKGROUND

Hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors. The movement of hydrogen between vessels may result in temperature increases and energy density decreases under the Joule-Thompson effect.

SUMMARY

This disclosure describes cooling hydrogen gas in dispensing operations.

In some aspects, a method includes receiving, at an inlet of a turboexpander generator, a flow of hydrogen gas from a hydrogen storage tank, reducing a pressure and a temperature of the hydrogen gas with the turboexpander generator, and outputting the hydrogen gas from the turboexpander generator toward a hydrogen dispenser.

This, and other aspects, can include one or more of the following features. Reducing a pressure and a temperature of the hydrogen gas with the turboexpander generator can include directing the flow of hydrogen gas to a turbine wheel of the turboexpander generator, driving rotation of the turbine wheel with the flow of hydrogen gas, and in response to rotating the turbine wheel, generating electrical current by an electric generator of the turboexpander generator. The method can further include providing the generated electrical current from the turboexpander generator to an electric chiller fluidly connected to the turboexpander generator, where the electric chiller is configured to cool the flow of hydrogen gas. The method can further include directing the generated electrical current from the turboexpander generator to a power electronics. The power electronics can include a variable speed drive connected to the turboexpander generator, and directing the generated electrical current to the power electronics can include converting the generated electrical current, with the variable speed drive, to an alternative current compatible with a power grid. Outputting the hydrogen gas from the turboexpander generator toward a hydrogen dispenser can include outputting the hydrogen gas at a desired output temperature. The method can further include cooling, with an electric chiller fluidly connected to the turboexpander generator, the flow of hydrogen gas from the hydrogen storage tank to the inlet of the turboexpander generator. Cooling the flow of hydrogen gas with the electric chiller can include controlling the electric chiller with a controller of a process control system. The method can further include measuring, with a temperature sensor of the process control system, a temperature of the flow of hydrogen gas from the outlet of the turboexpander generator, and controlling the electric chiller with the controller of the process control system can include controlling the electric chiller based on the measured temperature of the flow of hydrogen gas from the outlet of the turboexpander generator. The method can further include measuring, with a pressure sensor of the process control system, a pressure of the flow of hydrogen gas to the inlet of the turboexpander generator or from the outlet of the turboexpander generator, and measuring, with a temperature sensor of the process control system, a temperature of the flow of hydrogen gas upstream of the electric chiller, where controlling the electric chiller with the controller of the process control system can include controlling the electric chiller based on the measured pressure from the pressure sensor and the measured temperature from the temperature sensor.

In certain instances, a hydrogen dispensing system includes a hydrogen storage tank for storing hydrogen gas, a turboexpander generator fluidly connected to the hydrogen storage tank, and a dispenser fluidly connected to an outlet of the turboexpander generator. The turboexpander generator receives a flow of the hydrogen gas from the hydrogen storage tank to an inlet of the turboexpander generator, and the turboexpander generator reduces a pressure and a temperature of the flow of hydrogen gas. The dispenser receives the flow of hydrogen gas from the outlet of the turboexpander generator.

This, and other aspects, can include one or more of the following features. The turboexpander generator can include a turbine wheel to receive the flow of hydrogen gas and rotate in response to expansion of the hydrogen gas flowing into an inlet of the turbine wheel and out of an outlet of the turbine wheel, a rotor coupled to the turbine wheel to rotate with the turbine wheel, and a stationary stator, where the turboexpander generator generates an alternating current upon rotation of the rotor within the stator. The hydrogen dispensing system can further include a power electronics system electrically connected to an electrical output of the turboexpander generator, and the power electronics system to receive alternating current from the turboexpander generator. The power electronics system can include a variable speed drive connected to the electrical output of the turboexpander generator, the variable speed drive to convert the alternating current received from the turboexpander generator into an alternating current compatible with a power grid. The hydrogen dispensing system can further include an electric chiller fluidly connected to the turboexpander generator between the hydrogen storage tank and the turboexpander generator, the electric chiller to cool the flow of hydrogen gas. The electric chiller can be electrically connected to the turboexpander generator, the turboexpander generator to provide a generated alternating current to the electric chiller. The hydrogen dispensing system can further include a process control system communicably coupled to the electric chiller and including a controller to control the electric chiller. The process control system can further include a temperature sensor at an outlet side of the turboexpander generator, the temperature sensor to measure a temperature of the flow of hydrogen gas from the outlet of the turboexpander generator, and the process control system to control the electric chiller based on the measured temperature from the temperature sensor. The process control system can further include a pressure sensor to measure a pressure of the flow of hydrogen to the inlet of the turboexpander generator or from the outlet of the turboexpander generator, and a temperature sensor to measure a temperature of the flow of hydrogen upstream of the electric chiller, where the process control system controls the electric chiller based on a measured pressure from the pressure sensor and a measured temperature from the temperature sensor.

Certain aspects of the disclosure encompass a method including cooling, with an electric chiller, a flow of hydrogen gas from a hydrogen storage tank, receiving, at an inlet of a turboexpander generator, the cooled flow of hydrogen gas from the electric chiller, reducing a temperature of the cooled hydrogen gas with the turboexpander generator, and outputting the hydrogen gas from the turboexpander generator toward a hydrogen dispenser.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements. Drawings not to scale.

DETAILED DESCRIPTION

Figure 1:
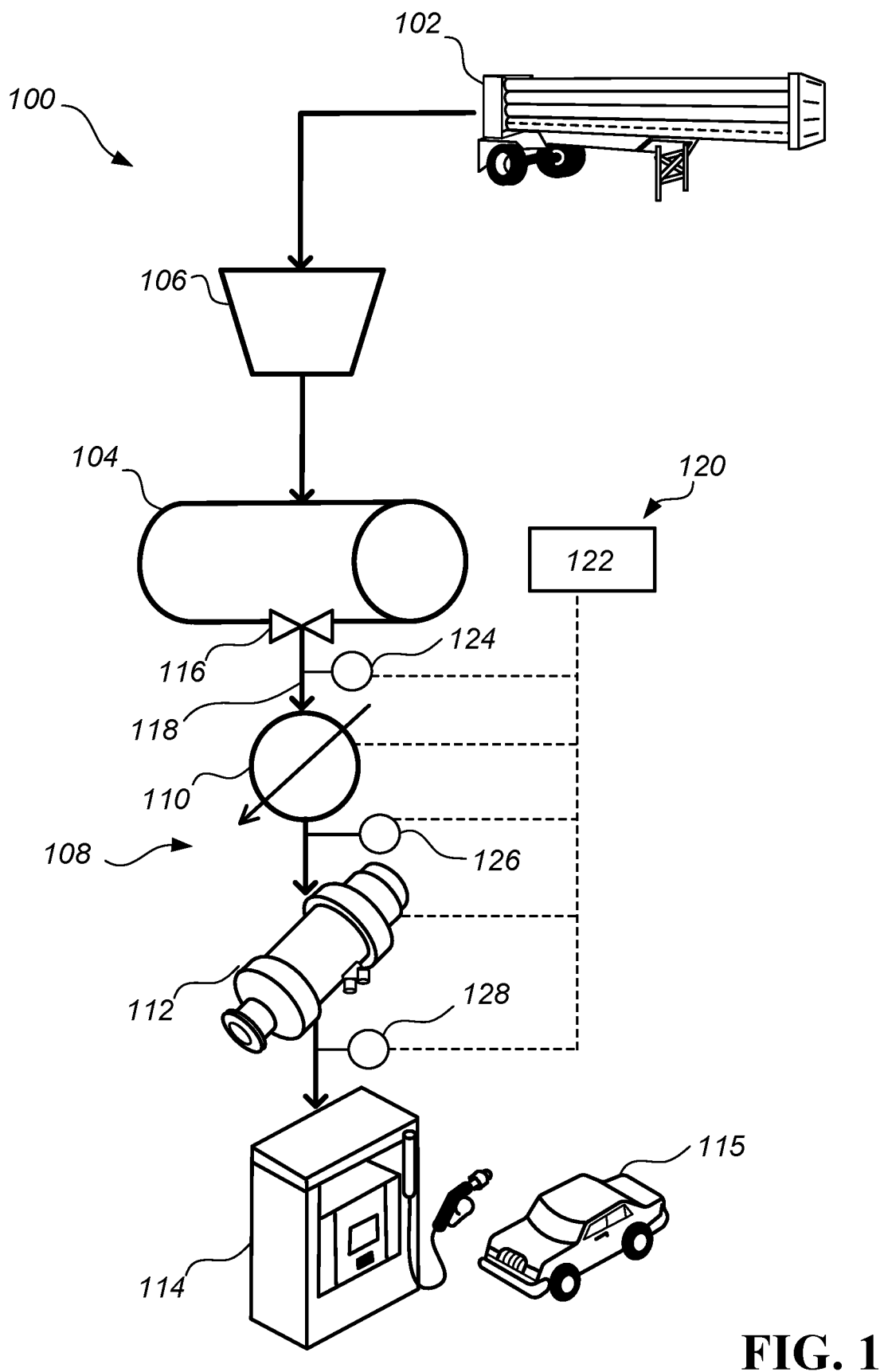
FIG. 1 is a schematic diagram of an example hydrogen dispensing system.

The present disclosure describes systems for cooling a hydrogen gas during a dispensing operation, such as during a filling of a hydrogen mobility vehicle. A hydrogen dispensing system includes a storage tank for storing a hydrogen, a dispenser for dispensing the hydrogen, such as to a hydrogen mobility vehicle, and a cooling system for cooling the hydrogen to a desired temperature prior to dispensing the hydrogen. The cooling system includes a turboexpander generator fluidly connected between the storage tank and the dispenser, and the turboexpander generator reduces a pressure and a temperature of the hydrogen prior to dispensing the hydrogen at the dispenser. The operation of reducing a pressure and temperature of the hydrogen gas by the turboexpander generator also generates electricity, which can be used to power other components of the hydrogen dispensing system, provided to a different electrical component, fed to a power grid, or directed elsewhere. For example, the turboexpander generator extracts enthalpy from the hydrogen prior to dispensing, which reduces the temperature and the pressure of the hydrogen gas. In some instances, the cooling system also includes an electric chiller between the storage tank and the dispenser to cool (i.e., remove heat from) the hydrogen gas. The electric chiller can supplement the turboexpander generator in cooling the hydrogen gas to a desired output temperature. In some instances, the turboexpander generator provides generated electricity to the electric chiller to reduce an electrical load in the electric chiller. In certain instances, the turboexpander generator eliminates a need for the electric chiller altogether, in that the turboexpander generator reduces a temperature of the hydrogen to a desired output temperature without the assistance of the electric chiller.

The hydrogen dispensing system includes a process control system that controls the turboexpander generator, electric chiller, or both, to provide the dispenser with hydrogen gas at a desired output temperature and/or pressure. For example, the process control system can adjust an amount of pre-cooling performed by the turboexpander, electric chiller, or both based on fluid characteristics of the hydrogen though the dispensing system. For example, the process control system can include temperature sensors and pressure sensors disposed along the hydrogen flowpath between the storage tank and the dispenser to measure characteristics of the hydrogen flow, and the process control system can control the electric chiller, turboexpander generator, or both to provide a desired output temperature at the dispenser.

Natural gas, hydrogen, and other process gases are pressurized to facilitate efficient transportation in pipelines or efficient storage in storage vessels. Transfer of these gases, such as between a pressure vessel source to a secondary vessel or chamber, is facilitated by a pressure differential between the pressure vessel source and the secondary vessel or chamber, with the former maintaining a higher pressure and the latter maintaining a lower pressure. Most process gases have a positive Joule-Thomson coefficient, which results in a temperature decrease and an energy density increase as these gases undergo a pressure reduction. However, a limited number of process gases, including hydrogen, can have a negative Joule-Thomson coefficient, which can result in a temperature increase and an energy density decrease as these gases undergo a pressure reduction. For example, under conventional conditions, the filling of a hydrogen pressure vessel results in a gas temperature increase and, consequently, an energy density decrease. It is more efficient to fill more hydrogen into any given receiving volume to increase an energy density of the hydrogen gas in the receiving volume. For example, a hydrogen mobility vehicle (e.g., hydrogen fuel cell vehicles, mining tractors, or other vehicles receiving hydrogen gas) have incrementally increased drive range with incrementally increased hydrogen storage. Existing industry specifications, such as SAE J2601 (Society of Automotive Engineers), indicate minimum temperatures that must be achieved before hydrogen can be dispensed into a vehicle, and electric chillers are utilized to remove heat from hydrogen. In the present disclosure, a turboexpander generator is disposed between a storage tank and a dispenser to reduce a temperature of the flow of hydrogen gas, and generate electricity. The turboexpander generator reduces the temperature of the hydrogen gas by extracting enthalpy from the hydrogen prior to a filling operation. For example, the turboexpander generator enables near-isentropic gas expansion of the hydrogen gas, which decreases the temperature of the hydrogen gas, instead of isenthalpic gas expansion, which increases the temperature of the hydrogen gas. The generated electricity from the turboexpander generator can be used to power the electric chiller, or provide power to another component within or outside of the hydrogen dispensing system.

FIG. 1 is a schematic diagram of an example hydrogen dispensing system 100 that can be used in a hydrogen fuel filling application, such as for hydrogen mobility vehicles. The hydrogen dispensing system 100 of FIG. 1 includes a hydrogen storage vessel 102, a hydrogen storage tank 104, a compressor 106 between the storage vessel 102 and the storage tank 104, a cooling system 108 including an electric chiller 110 and a turboexpander generator 112, and a dispenser 114. The hydrogen dispensing system 100 operates to store, cool, and dispense hydrogen gas, or other gaseous fuel, to a vehicle 115. The example hydrogen dispensing system 100 of FIG. 1 illustrates the vehicle 115 as a hydrogen mobility vehicle, which can include a hydrogen fuel cell vehicle, mining tractor, or other vehicle that receives hydrogen gas. However, the vehicle 115 can take other forms that can come and go at the dispenser 114. In some examples, the vehicle 115 (or other equipment) can arrive at the dispenser 114, receive an amount of cooled hydrogen gas from the dispenser 114, and depart away from the dispenser 114. The dispenser 114 can be disposed at a filling station that circulates through a number of vehicles to be filled, and the dispenser 114 can provide hydrogen gas to one or more of the vehicles at the filling station. In some instances, the dispenser 114 is a point of sale.

The storage vessel 102 can include a mobile storage vehicle, such as a tube trailer truck, for transportation of hydrogen in one or more storage tanks of the tube trailer truck to the fixed storage tank 104. The compressor 106 is used for compressing hydrogen as it is transferred from the storage vessel 102 to the storage tank 104, and is disposed along a flowpath for the hydrogen gas between the storage vessel 102 and the storage tank 104. The compressor 106 can be separate from the storage vessel 102 and storage tank 104, or integrated with the storage vessel 102 or storage tank 104.

The storage tank 104 stores the hydrogen gas until prompted to dispense all or a portion of the stored hydrogen through a control valve 116 and along a flowpath that flows through the cooling system 108 and to the dispenser 114. The storage tank 104 stores the hydrogen gas at a high pressure, such as up to 7,250 pounds per square inch gauge (psig) (i.e., 500 bar-g), and a high temperature, such as up to 80 degrees Fahrenheit (F). The control valve 116 controls a flow of the hydrogen gas out of the storage tank 104 and through a fluid pathway 118 extending from the storage tank 104 to the dispenser 114. The fluid pathway 118 can include additional valves and/or pressure regulators other than the control valve 116 to control the flow of hydrogen gas from the storage tank 104. The control valve 116 can be a pressure reduction valve that acts to release pressure from the hydrogen gas to lower the pressure of the hydrogen gas to a more controllable pressure level that the cooling system 108 and/or dispenser 114 can accept. Although only one control valve 116 is shown in the example hydrogen dispensing system 100 of FIG. 1, the fluid pathway 118 can include more than one valve, in sequence or in series or both, to reduce the pressure of the hydrogen gas to a desired pressure level.

The cooling system 108 is disposed along the fluid pathway 118 between the storage tank 104 and the dispenser 114, and acts to cool the hydrogen gas from the storage tank 104. For example, the cooling system 108 reduces a temperature of the hydrogen gas from a first temperature as received from the storage tank 104 to a second, lower temperature as supplied to the dispenser 114. The turboexpander generator 112, electric chiller 110, or both, reduce the temperature and pressure of the hydrogen gas. For example, the storage tank 104 can store the hydrogen gas at around 2,500 psig and 80 F, and the dispenser 114 can dispense the hydrogen at around 500 psig. The dispenser 114 dispenses the cooled hydrogen gas, such as to the hydrogen mobility vehicle 115, and fills a receiving vessel of the vehicle 115, for example, until the pressure in the receiving vessel is around 2,500 psig. The electric chiller 110 can be electrically powered to remove heat from a flow of hydrogen through the chiller 110 on its way to the dispenser 114. The cooling system 108 can cool the hydrogen gas to a temperature as low as −123 F, such as for a pressure of 500 psig. In some examples, as the receiving vessel of the vehicle 115 is filled by the dispenser 114 with hydrogen gas being output at around 500 psig and −123 F, the pressure in the receiving vessel increases, such as to 2,000 psig, along with the temperature of the hydrogen gas to between 25 F and 75 F. The cooling system 108 reduces the temperature of the hydrogen to the dispenser 114 in order to offset an expected increase in temperature of the hydrogen as it fills a receiving vessel of the vehicle 115.

The cooling system 108 of the example hydrogen dispensing system 100 of FIG. 1 includes the electric chiller 110 in series with the turboexpander generator 112 along the fluid pathway 118 that the hydrogen gas flows through between the storage tank 104 and the dispenser 114. The turboexpander generator 112 is shown downstream of the electric chiller 110, such that the hydrogen gas flows through the electric chiller 110 then through the turboexpander generator 112. In some instances, the turboexpander generator 112 is positioned upstream of the electric chiller 110, such that the output of the turboexpander generator 112 flows to the electric chiller 110. In other instances, the turboexpander generator 112 is positioned in parallel with the electric chiller 110, for example, to split the hydrogen gas flow such that a first portion of the hydrogen gas is cooled by the turboexpander generator 112 and a second portion of the hydrogen gas is cooled by the electric chiller 110. In certain instances, the turboexpander generator 112 performs sufficient cooling of the hydrogen gas such that the electric chiller 110 is excluded from the cooling system 108.

The turboexpander generator 112 is fluidly connected to the electric chiller 110, storage tank 104, and dispenser 114 via the fluid pathway 118. The turboexpander generator 112 receives a flow of the hydrogen gas from the storage tank 104, either directly from the storage tank 104 or via the electric chiller 110, and reduces a temperature and a pressure of the hydrogen gas that flows through the turboexpander generator 112. For example, the turboexpander generator 112 reduces the pressure and temperature of the hydrogen gas through a pressure reducing turbine system, described in greater detail later. The turboexpander generator 112 includes a turbine section and a generator section that are integrally connected, such that the flow of the hydrogen gas through the turbine section reduces a pressure of the hydrogen gas while also operating the generator section to produce an electrical current (e.g., an amount of electrical power) that can be supplied to other portions of the example hydrogen dispensing system 100, such as the electric chiller 110, the dispenser 114, a battery, and/or other electrical components or grids (e.g., power grid, local grid, microgrid, or municipal grid). The turboexpander generator 112 does not require additional power to reduce the pressure, temperature, or both the pressure and temperature of the hydrogen gas, other than a small amount of power (e.g., 1 kW) to operate a magnetic bearing system (e.g., one or more magnetic bearings, described later) within the turboexpander generator 112. Instead, the turboexpander generator 112 is passive, in that the turboexpander generator 112 relies on the input flow of hydrogen gas into the turboexpander generator 112 to extract enthalpy from the hydrogen, which reduces the temperature and the pressure of the hydrogen gas. The minimal amount of power consumed by the turboexpander generator 112 during operation is less than the more substantial amount of power generated by the turboexpander generator 112. In other words, a net power output of the turboexpander generator 112 is positive during operation because the amount of power required to operate the parasitic loads (e.g., magnetic bearings) of the turboexpander generator 112 is substantially less than the power output from operation of the turboexpander generator 112.

The turboexpander generator 112 outputs the depressurized hydrogen gas at a second, lower temperature at an outlet of the turboexpander generator 112 that is lower than the first temperature of the hydrogen gas at an inlet of the turboexpander generator 112. For example, the turboexpander generator 112 can output the hydrogen gas at a temperature as low as −40 C. In some instances, the turboexpander generator 112 can output the hydrogen gas at a temperature lower than −40 C, such as −86.1 C (−123 F) or lower. In some implementations, the output temperature of the hydrogen gas out of the turboexpander generator 112 is, in part, a function of the inlet characteristics of the hydrogen gas, such as inlet temperature and inlet pressure into the turboexpander generator 112.

The outlet temperature can be controlled through the design of the turbine wheel of the turboexpander generator 112, described in greater detail below. The turboexpander generator 112, in particular, the turbine wheel of the turbine section, is configured to (alone or in combination with additional valves in the example system 100) reduce the pressure of the hydrogen gas into a range between a maximum specified pressure and a minimum specified pressure at a temperature that is between a maximum specified temperature and a minimum specified temperature. This maximum specified temperature and minimum specified temperature can vary. In some implementations, the example hydrogen dispensing system 100 operates to dispense hydrogen gas within SAE J2601 standards for hydrogen fueling to maintain safety limits of a storage system on a vehicle to be filled (e.g., vehicle 115). Under the SAE J2601 standard, the output characteristics of the hydrogen gas from the system (e.g., the dispenser 114) include a minimum temperature of −40 C and a maximum temperature of 85 C, and a maximum dispenser pressure of 87.5 megapascals (MPa) (12,589 psig). The temperature and the pressure of the hydrogen changes during a fueling operation due to the movement of the hydrogen gas out of the dispenser and into a destination tank, and the SAE J2601 establish safe minimums and maximums for the temperature and pressure of the hydrogen gas in the vehicles storage vessel, such as on the vehicle 115. The turboexpander generator 112 is designed to output the hydrogen gas at the designated output temperature (e.g., −40 C) and output pressure (e.g., 500 psig), or within a range of acceptable output temperature (e.g., between −40 C and 85 C) and output pressure (e.g., less than 87.5 MPa), such as acceptable ranges within the SAE J2601 standards. The depressurized hydrogen gas from the turboexpander generator 112 can be diverted through the fluid pathway 118 toward the dispenser 114 downstream of the turboexpander generator 112 in preparation for dispensing.

The example hydrogen dispensing system 100 includes a process control system 120, for example, to monitor and control the flow of hydrogen gas through the hydrogen dispensing system 100. The process control system 120 controls the electric chiller 110, turboexpander generator 112, or both, to provide a desired output temperature of the hydrogen gas at the dispenser 114. For example, the temperature and/or pressure of the output of hydrogen gas at the dispenser 114 can be controlled by the process control system 120, for example, to be between a minimum threshold temperature and a maximum threshold temperature, and/or between a minimum threshold pressure and a maximum threshold pressure. The process control system 120 includes a controller 122 and one or more sensors disposed along the fluid pathway 118. In the example hydrogen dispensing system 100, the sensors include a first sensor 124 between the storage tank 104 and the chiller 110, a second sensor 126 between the chiller 110 and the turboexpander generator 112, and a third sensor 128 between the turboexpander generator 112 and the dispenser 114. Each of the first sensor 124, second sensor 126, and third sensor 128 can include a pressure sensor, temperature sensor (e.g., thermocouple), or both a pressure sensor and temperature sensor, that measures a pressure and/or temperature of the hydrogen gas at the respective locations along the fluid pathway 118.

The controller 122 is communicably coupled to the sensors (124, 126, 128), the electric chiller 110, and/or the turboexpander generator 112, and in some instances the control valve 116, and can control a cooling capacity of the electric chiller 110 based on measurements of the hydrogen gas from one or more of the sensors 124, 126, 128. The process control system 120 controls the operation of the electric chiller 110, for example, that outputs the hydrogen gas from the dispenser 114 at a particular output temperature or below an output temperature threshold. The controller 122 can determine a cooling capacity minimum, if any, for the electric chiller 110 based on measured parameters of the hydrogen gas from one or more of the sensors 124, 126, 128. For example, the third sensor 128 can measure a temperature of the hydrogen gas out of the turboexpander generator 112, and in response to the measured temperature, the process control system 120 can adjust an amount of pre-cooling applied to the hydrogen gas by the electric chiller 112. In some examples, the first sensor 124 measures a first pressure of the hydrogen upstream of the electric chiller 110, the second sensor 126 measures a second pressure of the hydrogen gas upstream of the turboexpander generator 112, and the third sensor measures a third pressure of the hydrogen gas downstream of the turboexpander generator. In response to the measured first pressure, measured second pressure, and measured third pressure, the process control system 120 can adjust the cooling capacity of the electric chiller 110 to control the temperature of the hydrogen gas downstream of the chiller 110. In some instances, the process control system 120 communicably connects to a pressure detection system of a hydrogen mobility vehicle, such as vehicle 115, that is being filled at the dispenser 114, and controls the electric chiller 110 in response to pressure data from the pressure detection system of the vehicle 115. In an example, the process control system 120 receives inputs such as on-board vehicle pressure, hydrogen gas pressure upstream of the turboexpander generator 112, hydrogen gas pressure downstream of the turboexpander generator 112, hydrogen gas temperature upstream of the electric chiller 110, or a combination of these inputs, and adjusts a cooling capacity of the electric chiller 110 to control the temperature of the hydrogen gas at the outlet of the chiller 110 and/or turboexpander generator 112. For example, the temperature drop of the hydrogen gas out of the turboexpander generator 112 can be determined from known values of the on-board vessel pressure, upstream hydrogen pressure, and hydrogen temperature into the turboexpander 112.

In the example hydrogen dispensing system 100 of FIG. 1, the turboexpander generator 112 supplies electrical power to the electric chiller 110. In some instances, the turboexpander generator 112 provides some or all of its generated electrical power to a different component within the system 100 or outside of the system 100, for example, to an electric component of the dispenser 114, to a battery, to another electrical component, or to a power grid. The power grid may be a municipal grid, a microgrid, local grid, or other grid type. In some implementations, the turboexpander generator 112 can provide power to the dispenser 114, other equipment at the filling station or part of the filling station itself, such as lights, buildings, or other components, and other equipment in the process between the storage vessel 102 and the dispenser 114. The turboexpander generator 112 can include power electronics to receive, control, and distribute the generated power from the generator section of the turboexpander generator 112, for example, using a variable speed drive.

In the example hydrogen dispensing system 100 of FIG. 1, the distributed gas is hydrogen gas. In some instances, the type of gas in the storage tank 104 can vary. For example, the gas can include hydrogen, oxygen, air, or a combination of these. In some examples, the example hydrogen dispensing system 100 can include multiple storage tanks 104 for one or multiple gas types. The example hydrogen dispensing system 100 can include other components for a filling operation of a vehicle or other vessel.

Figure 2:
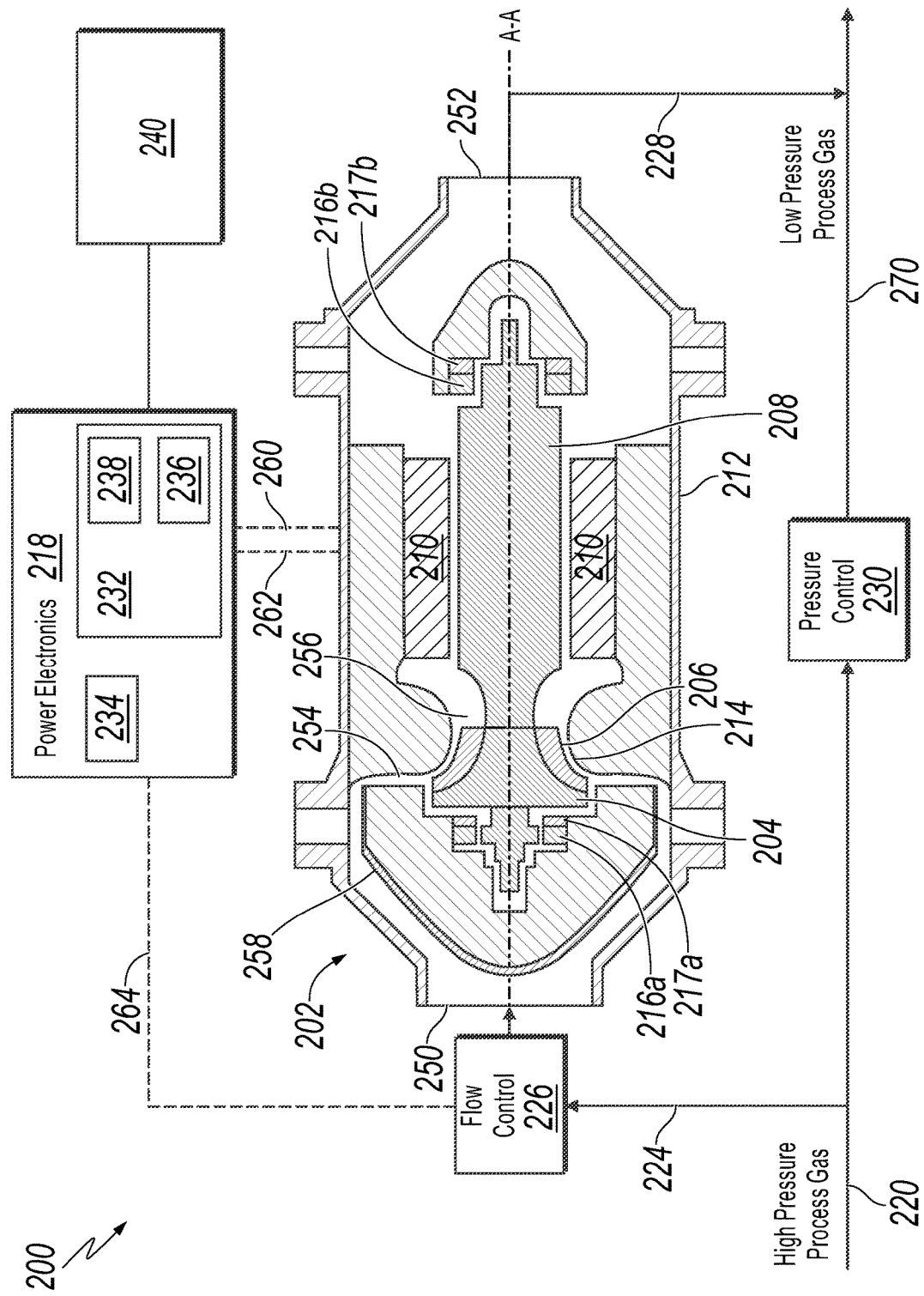
FIG. 2 is a schematic diagram of an example turboexpander generator coupled to an electrical component, which can be used in the example hydrogen dispensing system of FIG. 1.

FIG. 2 is a schematic diagram of an example turboexpander generator system 200 coupled to an electrical component 240. The example turboexpander generator system 200 can be used in the example turboexpander generator 112 of FIG. 1 to receive a flow of hydrogen gas from the storage tank 104 or electric chiller 110, reduce a pressure and a temperature of the hydrogen gas, and output the hydrogen gas at the lower temperature and lower pressure.

The example turboexpander generator system 200 includes a turboexpander generator 202 in parallel with a pressure control valve 230. However, the example turboexpander generator system 200 can exclude the pressure control valve 230 and the parallel fluid pathway 270, and instead the turboexpander generator 202 can receive an entirety of gas flow 220 from a fluid pathway. The turboexpander generator 202 is arranged axially so that the turboexpander generator 202 can be mounted in-line with a pipe, such as the fluid pathway 118 of FIG. 1. The turboexpander generator 202 acts as an electric generator by converting kinetic energy to rotational energy from gas expansion through a turbine wheel 204 and generating electrical energy. For example, rotation of the turbine wheel 204 can be used to rotate a rotor 208 within a stator 210, which then generates electrical energy.

The turboexpander generator 202 includes a high-performance, high-speed permanent magnet generator with an integrated radial in-flow expansion turbine wheel 204 and low loss active magnetic bearings (AMBs) 216a,b. The rotor assembly includes the permanent magnet section with the turbine wheel 204 mounted directly to the rotor hub of the rotor 208. The rotor 208 is levitated by the magnetic bearing system, for example, at longitudinal ends (e.g., axial ends) of the rotor 208, creating a frictionless (or near frictionless) interface between dynamic and static components. The AMBs 216a,b facilitate a lossless (or near lossless) rotation of the rotor 208.

The turboexpander generator 202 is designed to have gas flow through the system, which cools the generator section and eliminates the need for auxiliary cooling equipment. The power electronics 218 for the turboexpander generator 202 combines a Variable Speed Drive (VSD) 232 and Magnetic Bearing Controller (MBC) 234 into one cabinet, in some implementations. The VSD 232 allows for a consistent and clean delivery of generated power from the turboexpander generator 202 to the electrical component 240. For example, the VSD 232 regulates the frequency and/or amplitude of the generated current to match the frequency and/or amplitude of the electrical component 240. After expansion, the hydrogen gas exits the turboexpander generator 202 along the same axial path for downstream processes, such as a filling operation at the dispenser 114 of the example hydrogen dispensing system 100 of FIG. 1.

The turboexpander generator 202 includes a flow-through configuration. The flow-through configuration permits gas to flow from an inlet side of the turboexpander generator 202 to an outlet side of the turboexpander generator 202. The gas flows into a radial gas inlet 254 to the turbine wheel 204 and an axial gas outlet 256 from the turbine wheel 204. The gas then flows through the generator and out of the outlet 252, where the gas rejoins the fluid pathway 270. Generally, high pressure hydrogen gas 220 is directed to flow into the turboexpander generator 202 through a flow control system 226. The flow control system 226 includes a flow or mass control valve and an emergency shut off valve. In embodiments, the turboexpander housing 212 is hermetically sealed. For example, the turboexpander housing 212 is hermetically sealed to piping to and from the housing 212. The turboexpander housing 212 can be hermetically sealed to the inlet pipe leading into the turboexpander generator 202 and hermetically sealed to the outlet pipe leading away from the turboexpander generator 202. In certain instances, the example turboexpander generator system 200 excludes the flow control system 226 and control valve.

The high pressure hydrogen gas 220 is expanded by flowing through the turbine wheel 204, resulting in a pressure letdown of the hydrogen gas. Lower pressure hydrogen gas 228 exits the turboexpander generator 202. The expansion of the high pressure hydrogen gas 220 through the turbine wheel 204 causes the turbine wheel 204 to rotate, which causes the rotor 208 to rotate. The rotation of the rotor 208 within the stator 210 generates electrical energy. The turboexpander generator 202 achieves the desired pressure letdown and captures the energy from the pressure letdown to generate electricity. In some implementations, the pressure control valve 230, such as a conventional pressure regulator, is installed in parallel to the turboexpander generator 202. The pressure control valve 230 can be used to control the pressure of hydrogen gas that flows parallel to the turboexpander generator 202. Any excess high pressure hydrogen gas that is not directed into the turboexpander generator 202 can be directed through the pressure control valve 230.

The turboexpander generator 202 includes a turbine wheel 204. The turbine wheel 204 is shown as a radial inflow turbine wheel, though other configurations are within the scope of this disclosure, such as axial flow turbine wheels. In this example, high pressure hydrogen gas 224 is received from an inlet conduit 250 of the housing 212 and enters a radially oriented inlet 254 of the turbine wheel 204. In certain embodiments, the fluid flows through an inlet conduit 250 and is diverted by a flow diverter 258 to a radial inlet 254 that directs the flow into the radial inflow of the turbine wheel 204. In the example turboexpander generator 202 of FIG. 2, the flow diverter 258 includes a cone-shaped nose that diverts the gas flow radially outward to the radial inlet 254. The flow diverter 258 can be connected to or integrally formed with the bearing 216a and sensor 217a at the inlet side of the turboexpander generator 202 and the supports for this bearing 216a and sensor 217a surrounding the axial end of the rotor 208 at the inlet end of the turboexpander generator 202. After expanding, the lower pressure hydrogen gas exits the turbine wheel 204 from an axially oriented outlet 256 to outlet conduit 252 of the housing 212 at the outlet end of the turboexpander generator 202.

The turbine wheel 204 can be directly affixed to the rotor 208, or to an intermediate common shaft, for example, by fasteners, rigid drive shaft, welding, or other manner. For example, the turbine wheel 204 may be received at an axial end of the rotor 208, and held to the rotor 208 with a shaft. The shaft threads into the rotor 208 at one end, and at the other end, captures the turbine wheel 204 between the end of rotor 208 and a nut threadingly received on the shaft. The turbine wheel 204 and rotor 208 can be coupled without a gearbox and rotate at the same speed. In other instances, the turbine wheel 204 can be indirectly coupled to the rotor 208, for example, by a gear train, clutch mechanism, or other manner.

The turbine wheel 204 includes a plurality of turbine wheel blades 206 extending outwardly from a hub and that react with the expanding process gas to cause the turbine wheel 204 to rotate. FIG. 2 shows an unshrouded turbine wheel, in which each of the turbine blades 206 has an exposed, generally radially oriented blade tip extending between the radial inlet 254 and axial outlet 256. As discussed in more detail below, the blade tips substantially seal against a shroud 214 on the interior of the housing 212. In certain instances, the turbine wheel 204 is a shrouded turbine wheel.

In configurations with an un-shrouded turbine wheel 204, the housing 212 includes an inwardly oriented shroud 214 that resides closely adjacent to, and at most times during operation, out of contact with the turbine wheel blades 206. The close proximity of the turbine wheel blades 206 and shroud 214 substantially seals against passage of hydrogen gas therebetween, as the hydrogen gas flows through the turbine wheel 204. Although some amount of the gas may leak or pass between the turbine wheel blades 206 and the shroud 214, the leakage is insubstantial in the operation of the turbine wheel 204. In certain instances, the leakage can be commensurate with other similar unshrouded-turbine/shroud-surface interfaces, using conventional tolerances between the turbine wheel blades 206 and the shroud 214. The amount of leakage that is considered acceptable leakage may be predetermined. The operational parameters of the turbine generator may be optimized to reduce the leakage. In embodiments, the housing 212 is hermetically sealed to prevent process gases from escaping the radial inlet 254 of the turbine wheel 204.

The shroud 214 may reside at a specified distance away from the turbine wheel blades 206, and is maintained at a distance away from the turbine wheel blades 206 during operation of the turboexpander generator 202 by using magnetic positioning devices, including active magnetic bearings and position sensors.

Bearings 216*a* and 216*b* are arranged to rotatably support the rotor 208 and turbine wheel 204 relative to the stator 210 and the shroud 214. The turbine wheel 204 is supported in a non-cantilevered manner by the bearings 216*a* and 216*b*. In embodiments, the turbine wheel 204 may be supported in a cantilevered manner and bearings 216*a* and 216*b* may be located on the outlet side of turbine wheel 204. In certain instances, one or more of the bearings 216*a* or 216*b* can include ball bearings, needle bearings, magnetic bearings, foil bearings, journal bearings, or other bearing types.

Bearings 216*a* and 216*b* may be a combination radial and thrust bearing, supporting the rotor 208 in radial and axial directions. Other configurations could be utilized. The bearings 216*a* and 216*b* need not be the same types of bearings.

In the embodiments in which the bearings 216*a* and 216*b* are magnetic bearings, a magnetic bearing controller (MBC) 234 is used to control the magnetic bearings 216*a* and 216*b*. Position sensors 217*a*, 217*b* can be used to detect the position or changes in the position of the turbine wheel 204 and/or rotor 208 relative to the housing 212 or other reference point (such as a predetermined value). Position sensors 217*a*, 217*b* are connected to the housing 212 directly or indirectly, and the position sensors 217*a*, 217*b* can detect axial and/or radial displacement of the rotor 208 and its connected components (e.g., turbine wheel 204) relative to the housing 212. The magnetic bearing 216*a* and/or 216*b* can respond to the information from the positions sensors 217*a*, 217*b* and adjust for the detected displacement, if necessary. The MBC 234 may receive information from the position sensor(s) 217*a*, 217*b* and process that information to provide control signals to the magnetic bearings 216*a*, 216*b*. MBC 234 can communicate with the various components of the turboexpander generator 202 across a communications channel 262.

The use of magnetic bearings 216*a*, 216*b* and position sensors 217*a*, 217*b* to maintain and/or adjust the position of the turbine wheel blades 206 such that the turbine wheel blades 206 stay in close proximity to the shroud 214 permits the turboexpander generator 202 to operate without the need for seals (e.g., without the need for dynamic seals). The use of the active magnetic bearings 216*a,b* in the turboexpander generator 202 eliminates physical contact between rotating and stationary components, as well as eliminate lubrication, lubrication systems, and seals.

The turboexpander generator 202 may include one or more backup bearings. For example, at start-up and shutdown or in the event of a power outage that affects the operation of the magnetic bearings 216*a* and 216*b*, bearings may be used to rotatably support the turbine wheel 204 during that period of time. The backup bearings and may include ball bearings, needle bearings, journal bearings, or the like.

As mentioned previously, the turboexpander generator 202 is configured to generate electricity in response to the rotation of the rotor 208. In certain instances, the rotor 208 can include one or more permanent magnets coupled to the rotor 208, for example, on a radially outer surface of the rotor 208 adjacent to the stator 210. The stator 210 includes a plurality of conductive coils, for example, positioned adjacent to the magnet(s) on the rotor 208. Electrical current is generated by the rotation of the magnet(s) within the coils of the stator 210. The rotor 208 and stator 210 can be configured as a synchronous, permanent magnet, multiphase alternating current (AC) generator. The electrical output 260 can be a three-phase output, for example. In certain instances, stator 210 may include a plurality of coils (e.g., three or six coils for a three-phase AC output). When the rotor 208 is rotated, a voltage is induced in the stator coil. At any instant, the magnitude of the voltage induced in the coils is proportional to the rate at which the magnetic field encircled by the coil is changing with time (i.e., the rate at which the magnetic field is passing the two sides of the coil). In instances where the rotor 208 is coupled to rotate at the same speed as the turbine wheel 204, the turboexpander generator 202 is configured to generate electricity at that speed. Such a turboexpander generator 202 is what is referred to as a "high speed" turbine generator. For example, in embodiments, the turboexpander generator 202 can produce up to 135 kilowatts (kW) of power at a continuous speed of 25,000 revolutions per minute (rpm) of the rotor 208. In embodiments, the turboexpander generator 202 can produce on the order of 315 kW at certain rotational speeds (e.g., on the order of 23,000 rpm).

In some embodiments, the design of the turbine wheel 204, rotor 208, and/or stator 210 can be based on a desired parameter of the output gas from the turboexpander generator 202. For example, the design of the rotor 208 and stator 210 can be based on a desired temperature of the gas 228 at input of the turboexpander generator 202, output of the turboexpander generator 202, or both. The turboexpander generator 202 outputs the depressurized hydrogen gas at an output temperature that is cooler than the input hydrogen gas temperature. For example, the turboexpander generator 202 can output the hydrogen gas at a temperature as low as −185 Celcius (C), or −238 F. The outlet temperature can be controlled through the design of the turbine wheel 204. For example, a desired output temperature can be achieved by the design of the outer diameter of the stator 210 and/or outlet nozzle 252, the inner diameter of the stator 210 and/or outlet nozzle 252, the outer diameter of the rotor 208, the outer diameter of the eye tip of the exducer of the turbine wheel blades 206, the outer diameter of the eye root of the exducer of the turbine wheel blades 206, the exit flow angle from the stator 210, the entry flow angle to the rotor 208, the exducer root angle, the exducer tip angle, the depth of the channel at the radial inlet 254 of the rotor 208, other features, or a combination of these features. In some examples, by modifying and determining these geometries and parameters, the isentropic efficiency of the pressure reduction can be changed to a desired efficiency, which affects the outlet temperature such that when the isentropic efficiency is higher, the outlet temperature is lower, and when the isentropic efficiency is lower, the outlet temperature is higher.

In the example system 200 of FIG. 2, the turboexpander generator 202 is coupled to power electronics 218. Power electronics 218 includes the variable speed drive (VSD) 232 (or variable frequency drive) and the magnetic bearing controller (MBC) 234 (discussed above).

The electrical output 260 of the turboexpander generator 202 is connected to the VSD 232, which can be programmed to specific power requirements. The VSD 232 can include an insulated-gate bipolar transistor (IGBT) rectifier 236 to convert the variable frequency, high voltage output from the turboexpander generator 202 to a direct current (DC). The rectifier 236 can be a three-phase rectifier for three-phase AC input current. An inverter 238 then converts the DC from the rectifier AC for supplying to the electrical component 240, such as an electric chiller, a battery, a power grid, or other component. The inverter 238 can convert the DC to 380 VAC-480 VAC at 50 to 60 Hz for delivery to the component. The specific output of the VSD 232 depends on the power grid and application. Other conversion values are within the scope of this disclosure. The VSD 232 matches its output to the electrical component 240 (e.g., chiller, power grid, battery, or other) by sampling the voltage and frequency of the electrical component 240, and then changing the output voltage and frequency of the inverter 238 to match the sampled voltage and frequency. The output of the VSD 232 can be electrically coupled to a load of the component 240, such as a power grid to supply power to the grid. For example, the power grid can include a microgrid of the example hydrogen dispensing system 100 of FIG. 1, or a microgrid at a site of the example hydrogen dispensing system 100 for supplying power to equipment within or connected to the example hydrogen dispensing system 100.

The turboexpander generator 202 is also connected to the MBC 234 in the power electronics 218. The MBC 234 constantly monitors position, current, temperature, and other parameters to ensure that the turboexpander generator 202 and the active magnetic bearings 216a and 216b are operating as desired. For example, the MBC 234 is coupled to position sensors 217a, 217b to monitor radial and/or axial position of the turbine wheel 204 and the rotor 208. The MBC 234 can control the magnetic bearings 216a, 216b to selectively change the stiffness and damping characteristics of the magnetic bearings 216a, 216b as a function of spin speed. The MBC 234 can also control synchronous cancellation, including automatic balancing control, adaptive vibration control, adaptive vibration rejection, and unbalance force rejection control. In instances that the example turboexpander generator system 200 is incorporated into the example hydrogen dispensing system 100 of FIG. 1, the power electronics 218, including the MBC 234, can be communicably connected to or integral with the power control system 120, for example, to control operation of the turboexpander generator 202.

Figure 3:
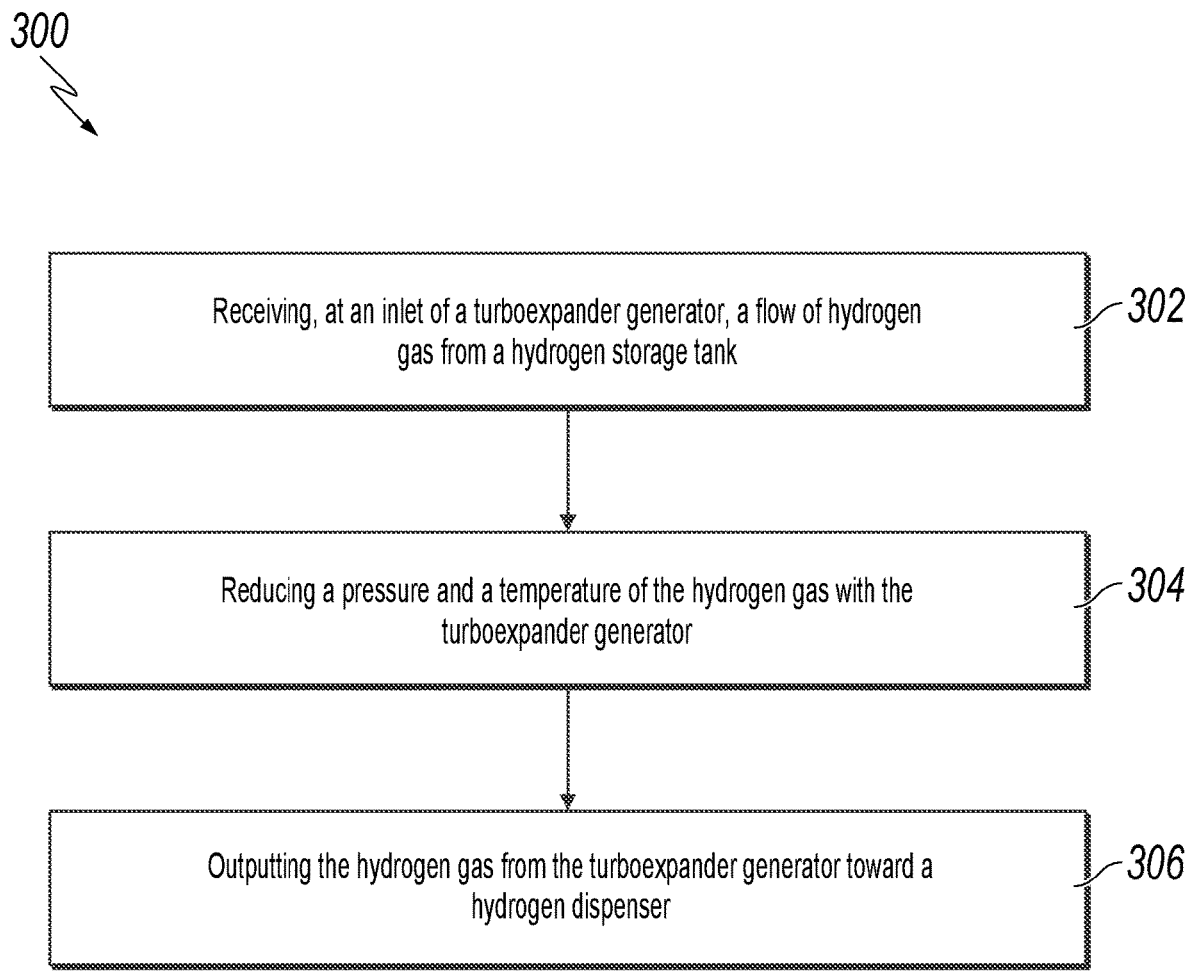
FIG. 3 is a flowchart describing an example method for cooling hydrogen gas in a hydrogen dispensing system.

FIG. 3 is a flowchart describing an example method 300 describing an example method for cooling hydrogen gas in a hydrogen dispensing system, for example, performed by the example hydrogen dispensing system 100 of FIG. 1. At 302, a flow of hydrogen gas is received at an inlet of a turboexpander generator from a hydrogen storage tank. At 304, the turboexpander generator reduces a pressure and a temperature of the hydrogen gas. At 306, the hydrogen gas is outputted from the turboexpander generator toward a hydrogen dispenser. In some instances, either prior to the turboexpander generator receiving the hydrogen gas or after the hydrogen gas is outputted from the turboexpander generator, an electric chiller further cools the flow of hydrogen gas from the hydrogen storage tank or from the turboexpander generator.

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. A method comprising:
    receiving, at an inlet of a turboexpander generator, a flow of hydrogen gas from a hydrogen storage tank, wherein an electric chiller is fluidly connected to the turboexpander generator between the hydrogen storage tank and the turboexpander generator, the electric chiller configured to cool the flow of hydrogen gas;
    reducing a pressure and a temperature of the hydrogen gas with the turboexpander generator; and
    outputting the hydrogen gas from the turboexpander generator toward a hydrogen dispenser.

2. The method of claim 1, wherein reducing a pressure and a temperature of the hydrogen gas with the turboexpander generator comprises:
    directing the flow of hydrogen gas to a turbine wheel of the turboexpander generator;
    driving rotation of the turbine wheel with the flow of hydrogen gas; and
    in response to rotating the turbine wheel, generating electrical current by an electric generator of the turboexpander generator.

3. The method of claim 2, further comprising providing the generated electrical current from the turboexpander generator to the electric chiller fluidly connected to the turboexpander generator, the electric chiller configured to cool the flow of hydrogen gas.

4. The method of claim 2, further comprising directing the generated electrical current from the turboexpander generator to a power electronics.

5. The method of claim 4, wherein the power electronics comprises a variable speed drive connected to the turboexpander generator; and
directing the generated electrical current to the power electronics comprises converting the generated electrical current, with the variable speed drive, to an alternative current compatible with a power grid.

6. The method of claim 1, wherein outputting the hydrogen gas from the turboexpander generator toward a hydrogen dispenser comprises outputting the hydrogen gas at a desired output temperature.

7. The method of claim 1, further comprising cooling, with the electric chiller fluidly connected to the turboexpander generator, the flow of hydrogen gas from the hydrogen storage tank to the inlet of the turboexpander generator.

8. The method of claim 7, wherein cooling the flow of hydrogen gas with the electric chiller comprises controlling the electric chiller with a controller of a process control system.

9. The method of claim 8, further comprising measuring, with a temperature sensor of the process control system, a temperature of the flow of hydrogen gas from the outlet of the turboexpander generator; and
wherein controlling the electric chiller with the controller of the process control system comprises controlling the electric chiller based on the measured temperature of the flow of hydrogen gas from the outlet of the turboexpander generator.

10. The method of claim 8, further comprising:
measuring, with a pressure sensor of the process control system, a pressure of the flow of hydrogen gas to the inlet of the turboexpander generator or from the outlet of the turboexpander generator; and
measuring, with a temperature sensor of the process control system, a temperature of the flow of hydrogen gas upstream of the electric chiller; and
wherein controlling the electric chiller with the controller of the process control system comprises controlling the electric chiller based on the measured pressure from the pressure sensor and the measured temperature from the temperature sensor.

11. A hydrogen dispensing system, comprising:
a hydrogen storage tank for storing hydrogen gas;
a turboexpander generator fluidly connected to the hydrogen storage tank, the turboexpander generator to receive a flow of the hydrogen gas from the hydrogen storage tank to an inlet of the turboexpander generator, the turboexpander generator configured to reduce a pressure and a temperature of the flow of hydrogen gas;
an electric chiller fluidly connected to the turboexpander generator between the hydrogen storage tank and the turboexpander generator, the electric chiller configured to cool the flow of hydrogen gas; and
a dispenser fluidly connected to an outlet of the turboexpander generator, the dispenser configured to receive the flow of hydrogen gas from the outlet of the turboexpander generator.

12. The hydrogen dispensing system of claim 11, wherein the turboexpander generator comprises:

a turbine wheel configured to receive the flow of hydrogen gas and rotate in response to expansion of the hydrogen gas flowing into an inlet of the turbine wheel and out of an outlet of the turbine wheel,
a rotor coupled to the turbine wheel and configured to rotate with the turbine wheel, and
a stationary stator, the turboexpander generator to generate an alternating current upon rotation of the rotor within the stator.

13. The hydrogen dispensing system of claim 12, further comprising a power electronics system electrically connected to an electrical output of the turboexpander generator and to receive alternating current from the turboexpander generator.

14. The hydrogen dispensing system of claim 13, wherein the power electronics system comprises a variable speed drive connected to the electrical output of the turboexpander generator, the variable speed drive to convert the alternating current received from the turboexpander generator into an alternating current compatible with a power grid.

15. The hydrogen dispensing system of claim 14, wherein the electric chiller is electrically connected to the turboexpander generator, the turboexpander generator configured to provide a generated alternating current to the electric chiller.

16. The hydrogen dispensing system of claim 15, further comprising a process control system communicably coupled to the electric chiller and comprising a controller to control the electric chiller.

17. The hydrogen dispensing system of claim 16, wherein the process control system further comprises a temperature sensor at an outlet side of the turboexpander generator, the temperature sensor to measure a temperature of the flow of hydrogen gas from the outlet of the turboexpander generator, and the process control system configured to control the electric chiller based on the measured temperature from the temperature sensor.

18. The hydrogen dispensing system of claim 16, wherein the process control system further comprises:
a pressure sensor to measure a pressure of the flow of hydrogen to the inlet of the turboexpander generator or from the outlet of the turboexpander generator; and
a temperature sensor to measure a temperature of the flow of hydrogen upstream of the electric chiller,
wherein the process control system is configured to control the electric chiller based on a measured pressure from the pressure sensor and a measured temperature from the temperature sensor.

19. A method comprising:
cooling, with an electric chiller, a flow of hydrogen gas from a hydrogen storage tank;
receiving, at an inlet of a turboexpander generator, the cooled flow of hydrogen gas from the electric chiller;
reducing a temperature of the cooled hydrogen gas with the turboexpander generator; and
outputting the hydrogen gas from the turboexpander generator toward a hydrogen dispenser.

* * * * *